(12) United States Patent
Basir et al.

(10) Patent No.: US 8,856,009 B2
(45) Date of Patent: Oct. 7, 2014

(54) MULTI-PARTICIPANT, MIXED-INITIATIVE VOICE INTERACTION SYSTEM

(75) Inventors: Otman A. Basir, Waterloo (CA); William Ben Miners, Guelph (CA)

(73) Assignee: Intelligent Mechatronic Systems Inc., Waterloo, Ontario (CA)

( * ) Notice: Subject to any disclaimer, the term of this patent is extended or adjusted under 35 U.S.C. 154(b) by 1226 days.

(21) Appl. No.: 12/410,864

(22) Filed: Mar. 25, 2009

(65) Prior Publication Data

US 2009/0248420 A1    Oct. 1, 2009

Related U.S. Application Data

(60) Provisional application No. 61/039,248, filed on Mar. 25, 2008.

(51) Int. Cl.
| | | |
|---|---|---|
| G10L 21/00 | (2013.01) | |
| H04M 1/60 | (2006.01) | |
| H04M 1/57 | (2006.01) | |
| H04M 1/725 | (2006.01) | |

(52) U.S. Cl.
CPC ........ H04M 1/6075 (2013.01); H04M 2250/74 (2013.01); H04M 1/57 (2013.01); H04M 2250/02 (2013.01); H04M 1/72552 (2013.01)
USPC ....................................... 704/270.1; 704/270

(58) Field of Classification Search
None
See application file for complete search history.

(56) References Cited

U.S. PATENT DOCUMENTS

| | | |
|---|---|---|
| 3,928,724 A | 12/1975 | Andersen et al. |
| 4,083,003 A | 4/1978 | Haemmig |
| 4,532,052 A | 7/1985 | Weaver et al. |
| 4,591,823 A | 5/1986 | Horvat |
| 4,989,144 A | 1/1991 | Barnett et al. |
| 5,177,685 A | 1/1993 | Davis et al. |
| 5,246,073 A | 9/1993 | Sandiford et al. |
| 5,488,360 A | 1/1996 | Ray |
| 5,638,425 A | 6/1997 | Meador et al. |
| 5,760,742 A | 6/1998 | Branch et al. |
| 5,836,392 A | 11/1998 | Urlwin-Smith |

(Continued)

FOREIGN PATENT DOCUMENTS

| | | |
|---|---|---|
| CA | 2405813 A1 | 11/2001 |
| DE | 19920227 A1 | 11/2000 |

(Continued)

OTHER PUBLICATIONS

Harel, "Statecharts: A Visual Formalism for Complex Systems", Science of Computer Programming, vol. 8, Issue 3, pp. 231-274, Jun. 1, 1987.*

(Continued)

*Primary Examiner* — Brian Albertalli
(74) *Attorney, Agent, or Firm* — Carlson, Gaskey & Olds P.C.

(57) ABSTRACT

A voice interaction system includes one or more independent, concurrent state charts, which are used to model the behavior of each of a plurality of participants. The model simplifies the notation and provide a clear description of the interactions between multiple participants. These state charts capture the flow of voice prompts, the impact of externally initiated events and voice commands, and capture the progress of audio through each prompt. This system enables a method to prioritize conflicting and concurrent events leveraging historical patterns and the progress of in-progress prompts.

23 Claims, 5 Drawing Sheets

(56) References Cited

U.S. PATENT DOCUMENTS

| | | | |
|---|---|---|---|
| 5,912,951 A | 6/1999 | Checchio et al. | |
| 5,931,907 A | 8/1999 | Davies et al. | |
| 5,938,706 A | 8/1999 | Feldman | |
| 5,944,783 A | 8/1999 | Nieten | |
| 5,963,618 A | 10/1999 | Porter | |
| 5,983,108 A | 11/1999 | Kennedy et al. | |
| 6,012,030 A * | 1/2000 | French-St. George et al. | 704/275 |
| 6,041,300 A | 3/2000 | Ittycheriah et al. | |
| 6,088,650 A | 7/2000 | Schipper et al. | |
| 6,147,598 A | 11/2000 | Murphy et al. | |
| 6,176,315 B1 | 1/2001 | Reddy et al. | |
| 6,192,364 B1 | 2/2001 | Baclawski | |
| 6,192,986 B1 | 2/2001 | Urlwin-Smith | |
| 6,196,317 B1 | 3/2001 | Hardy | |
| 6,212,474 B1 | 4/2001 | Fowler et al. | |
| 6,253,122 B1 | 6/2001 | Razavi et al. | |
| 6,282,495 B1 | 8/2001 | Kirkhart et al. | |
| 6,295,449 B1 | 9/2001 | Westerlage et al. | |
| 6,356,869 B1 * | 3/2002 | Chapados et al. | 704/275 |
| 6,362,748 B1 | 3/2002 | Huang | |
| 6,367,022 B1 | 4/2002 | Gillespie et al. | |
| 6,377,825 B1 | 4/2002 | Kennedy et al. | |
| 6,385,202 B1 | 5/2002 | Katseff et al. | |
| 6,529,863 B1 * | 3/2003 | Ball et al. | 704/1 |
| 6,553,102 B1 | 4/2003 | Fogg et al. | |
| 6,580,973 B2 | 6/2003 | Leivian et al. | |
| 6,594,557 B1 | 7/2003 | Stefan et al. | |
| 6,607,035 B1 | 8/2003 | Reddy et al. | |
| 6,615,130 B2 | 9/2003 | Myr | |
| 6,622,083 B1 | 9/2003 | Knockeart et al. | |
| 6,650,997 B2 | 11/2003 | Funk | |
| 6,690,268 B2 | 2/2004 | Schofield et al. | |
| 6,697,638 B1 | 2/2004 | Larsson et al. | |
| 6,714,223 B2 | 3/2004 | Asami et al. | |
| 6,721,633 B2 | 4/2004 | Funk et al. | |
| 6,724,863 B1 | 4/2004 | Bedingfield | |
| 6,731,239 B2 | 5/2004 | Wall et al. | |
| 6,738,742 B2 * | 5/2004 | Badt et al. | 704/270 |
| 6,748,211 B1 | 6/2004 | Isaac et al. | |
| 6,764,981 B1 | 7/2004 | Eoff et al. | |
| 6,788,935 B1 | 9/2004 | McKenna et al. | |
| 6,788,949 B1 | 9/2004 | Bansal | |
| 6,812,888 B2 | 11/2004 | Drury et al. | |
| 6,812,942 B2 | 11/2004 | Ribak | |
| 6,839,669 B1 * | 1/2005 | Gould et al. | 704/246 |
| 6,842,510 B2 * | 1/2005 | Sakamoto | 379/102.01 |
| 6,895,084 B1 | 5/2005 | Saylor et al. | |
| 6,895,310 B1 | 5/2005 | Kolls | |
| 6,909,947 B2 | 6/2005 | Douros et al. | |
| 6,925,154 B2 | 8/2005 | Gao et al. | |
| 6,944,679 B2 | 9/2005 | Parupudi et al. | |
| 6,968,272 B2 | 11/2005 | Knockeart et al. | |
| 6,970,703 B2 | 11/2005 | Fuchs et al. | |
| 6,970,783 B2 | 11/2005 | Knockeart et al. | |
| 6,972,669 B2 | 12/2005 | Saito et al. | |
| 6,982,635 B2 | 1/2006 | Obradovich | |
| 7,039,166 B1 * | 5/2006 | Peterson et al. | 379/88.18 |
| 7,049,982 B2 | 5/2006 | Sleboda et al. | |
| 7,050,834 B2 | 5/2006 | Harwood et al. | |
| 7,062,286 B2 | 6/2006 | Grivas et al. | |
| 7,069,118 B2 | 6/2006 | Coletrane et al. | |
| 7,085,629 B1 | 8/2006 | Gotou et al. | |
| 7,091,160 B2 | 8/2006 | Dao et al. | |
| 7,113,911 B2 | 9/2006 | Hinde et al. | |
| 7,117,075 B1 | 10/2006 | Larschan et al. | |
| 7,127,271 B1 | 10/2006 | Fujisaki | |
| 7,151,997 B2 | 12/2006 | Uhlmann et al. | |
| 7,191,040 B2 | 3/2007 | Pajakowski et al. | |
| 7,191,059 B2 | 3/2007 | Asahara | |
| 7,228,224 B1 | 6/2007 | Rosen et al. | |
| 7,280,975 B1 | 10/2007 | Donner | |
| 7,286,825 B2 | 10/2007 | Shishido et al. | |
| 7,286,857 B1 | 10/2007 | Walker et al. | |
| 7,289,796 B2 | 10/2007 | Kudoh | |
| 7,296,066 B2 | 11/2007 | Lehaff et al. | |
| 7,346,374 B2 | 3/2008 | Witkowski et al. | |
| 7,356,474 B2 | 4/2008 | Kumhyr | |
| 7,363,229 B2 * | 4/2008 | Falcon et al. | 704/275 |
| 7,366,795 B2 | 4/2008 | O'Neil et al. | |
| 7,386,376 B2 | 6/2008 | Basir et al. | |
| 7,400,879 B2 | 7/2008 | Lehaff et al. | |
| 7,412,078 B2 | 8/2008 | Kim | |
| 7,412,328 B2 | 8/2008 | Uhlmann et al. | |
| 7,426,647 B2 | 9/2008 | Fleck et al. | |
| 7,444,286 B2 | 10/2008 | Roth et al. | |
| 7,461,344 B2 * | 12/2008 | Young et al. | 715/727 |
| 7,496,514 B2 * | 2/2009 | Ross et al. | 704/270 |
| 7,526,431 B2 | 4/2009 | Roth et al. | |
| 7,554,435 B2 | 6/2009 | Tengler et al. | |
| 7,646,296 B2 | 1/2010 | Ohki | |
| 7,653,545 B1 * | 1/2010 | Starkie | 704/275 |
| 7,689,253 B2 | 3/2010 | Basir | |
| 7,693,720 B2 | 4/2010 | Kennewick et al. | |
| 7,769,364 B2 | 8/2010 | Logan et al. | |
| 7,814,353 B2 | 10/2010 | Naitou et al. | |
| 7,859,392 B2 | 12/2010 | McClellan et al. | |
| 7,865,309 B2 | 1/2011 | Taylor | |
| 7,881,864 B2 | 2/2011 | Smith | |
| 7,912,186 B2 * | 3/2011 | Howell et al. | 379/88.04 |
| 7,948,969 B2 | 5/2011 | Boys | |
| 7,983,811 B2 | 7/2011 | Basir et al. | |
| 8,015,010 B2 | 9/2011 | Basir | |
| 8,060,285 B2 | 11/2011 | Chigusa | |
| 8,090,848 B2 | 1/2012 | Maes et al. | |
| 8,218,737 B2 | 7/2012 | Odinak | |
| 8,289,186 B2 | 10/2012 | Osafune | |
| 8,350,721 B2 | 1/2013 | Carr | |
| 2001/0005854 A1 | 6/2001 | Murata et al. | |
| 2001/0021640 A1 | 9/2001 | Lappe | |
| 2001/0056345 A1 | 12/2001 | Guedalia | |
| 2002/0032042 A1 | 3/2002 | Poplawsky et al. | |
| 2002/0041659 A1 | 4/2002 | Beswick et al. | |
| 2003/0023435 A1 * | 1/2003 | Josephson | 704/235 |
| 2003/0181543 A1 | 9/2003 | Reddy et al. | |
| 2003/0227390 A1 | 12/2003 | Hung et al. | |
| 2003/0231550 A1 | 12/2003 | Macfarlane | |
| 2004/0001575 A1 | 1/2004 | Tang | |
| 2004/0058647 A1 | 3/2004 | Zhang et al. | |
| 2004/0082340 A1 | 4/2004 | Eisinger | |
| 2004/0090950 A1 | 5/2004 | Lauber et al. | |
| 2004/0102188 A1 | 5/2004 | Boyer et al. | |
| 2004/0104842 A1 | 6/2004 | Drury et al. | |
| 2004/0116106 A1 | 6/2004 | Shishido et al. | |
| 2004/0133345 A1 | 7/2004 | Asahara | |
| 2004/0145457 A1 | 7/2004 | Schofield et al. | |
| 2004/0158367 A1 | 8/2004 | Basu et al. | |
| 2004/0182576 A1 | 9/2004 | Reddy et al. | |
| 2004/0193420 A1 | 9/2004 | Kennewick et al. | |
| 2004/0243406 A1 | 12/2004 | Rinscheid | |
| 2004/0257210 A1 | 12/2004 | Chen et al. | |
| 2005/0010418 A1 * | 1/2005 | McNair et al. | 704/275 |
| 2005/0046584 A1 | 3/2005 | Breed | |
| 2005/0049781 A1 | 3/2005 | Oesterling | |
| 2005/0054386 A1 | 3/2005 | Chung | |
| 2005/0066207 A1 | 3/2005 | Fleck et al. | |
| 2005/0074113 A1 * | 4/2005 | Mathew et al. | 379/265.02 |
| 2005/0088320 A1 | 4/2005 | Kovach | |
| 2005/0107132 A1 | 5/2005 | Kamdar et al. | |
| 2005/0107944 A1 | 5/2005 | Hovestadt et al. | |
| 2005/0130631 A1 | 6/2005 | Maguire et al. | |
| 2005/0131677 A1 | 6/2005 | Assadollahi | |
| 2005/0135573 A1 * | 6/2005 | Harwood et al. | 379/88.03 |
| 2005/0143134 A1 | 6/2005 | Harwood et al. | |
| 2005/0174217 A1 | 8/2005 | Basir et al. | |
| 2005/0230434 A1 | 10/2005 | Campbell et al. | |
| 2005/0285743 A1 | 12/2005 | Weber | |
| 2005/0288190 A1 | 12/2005 | Dao et al. | |
| 2006/0009885 A1 | 1/2006 | Raines | |
| 2006/0030298 A1 | 2/2006 | Burton et al. | |
| 2006/0052921 A1 | 3/2006 | Bodin et al. | |
| 2006/0055565 A1 | 3/2006 | Kawamata et al. | |
| 2006/0074658 A1 * | 4/2006 | Chadha | 704/246 |
| 2006/0089754 A1 | 4/2006 | Mortenson | |

(56) References Cited

U.S. PATENT DOCUMENTS

| | | |
|---|---|---|
| 2006/0101311 A1 | 5/2006 | Lipscomb et al. |
| 2006/0214783 A1 | 9/2006 | Ratnakar |
| 2006/0217858 A1 | 9/2006 | Peng |
| 2006/0271275 A1 | 11/2006 | Verma |
| 2007/0016813 A1 | 1/2007 | Naitou et al. |
| 2007/0038360 A1 | 2/2007 | Sakhpara |
| 2007/0042812 A1 | 2/2007 | Basir |
| 2007/0043574 A1 | 2/2007 | Coffman et al. |
| 2007/0050108 A1 | 3/2007 | Larschan et al. |
| 2007/0118380 A1* | 5/2007 | Konig ............ 704/270 |
| 2007/0162552 A1 | 7/2007 | Shaffer et al. |
| 2007/0282593 A1* | 12/2007 | Thompson et al. ......... 704/9 |
| 2008/0004875 A1 | 1/2008 | Chengalvarayan et al. |
| 2008/0027643 A1 | 1/2008 | Basir et al. |
| 2008/0031433 A1 | 2/2008 | Sapp et al. |
| 2008/0071465 A1 | 3/2008 | Chapman et al. |
| 2008/0119134 A1 | 5/2008 | Rao |
| 2008/0132270 A1 | 6/2008 | Basir |
| 2008/0133230 A1 | 6/2008 | Herforth |
| 2008/0140408 A1 | 6/2008 | Basir |
| 2008/0201135 A1* | 8/2008 | Yano ............ 704/201 |
| 2008/0252487 A1 | 10/2008 | McClellan et al. |
| 2008/0263451 A1* | 10/2008 | Portele et al. ............ 715/727 |
| 2008/0270015 A1 | 10/2008 | Ishikawa et al. |
| 2008/0306740 A1* | 12/2008 | Schuck et al. ............ 704/275 |
| 2009/0011799 A1 | 1/2009 | Douthitt et al. |
| 2009/0099836 A1 | 4/2009 | Jacobsen et al. |
| 2009/0106036 A1 | 4/2009 | Tamura et al. |
| 2009/0124272 A1 | 5/2009 | White et al. |
| 2009/0161841 A1 | 6/2009 | Odinak |
| 2009/0176522 A1 | 7/2009 | Kowalewski et al. |
| 2009/0204410 A1* | 8/2009 | Mozer et al. ............ 704/275 |
| 2009/0259349 A1 | 10/2009 | Golenski |
| 2009/0298474 A1 | 12/2009 | George |
| 2009/0318119 A1 | 12/2009 | Basir et al. |
| 2010/0023246 A1 | 1/2010 | Zhao et al. |
| 2010/0036595 A1 | 2/2010 | Coy et al. |
| 2010/0097239 A1 | 4/2010 | Campbell et al. |
| 2010/0100307 A1 | 4/2010 | Kim |
| 2010/0130180 A1 | 5/2010 | Lim |
| 2010/0137037 A1 | 6/2010 | Basir |
| 2010/0138140 A1 | 6/2010 | Okuyama |
| 2010/0159968 A1 | 6/2010 | Ng |
| 2010/0198428 A1 | 8/2010 | Sultan et al. |
| 2010/0211301 A1 | 8/2010 | McClellan |
| 2010/0222939 A1 | 9/2010 | Namburu et al. |
| 2010/0280884 A1 | 11/2010 | Levine et al. |
| 2011/0208510 A1* | 8/2011 | Castillo et al. ............ 704/9 |
| 2011/0302253 A1 | 12/2011 | Simpson-Anderson et al. |

FOREIGN PATENT DOCUMENTS

| | | |
|---|---|---|
| DE | 102007062958 A1 | 6/2009 |
| EP | 1 575 225 A2 | 9/2005 |
| EP | 1 701 247 A2 | 9/2006 |
| EP | 1568970 B1 | 12/2006 |
| EP | 901000 B1 | 2/2007 |
| EP | 1575225 B1 | 9/2007 |
| EP | 1463345 A3 | 10/2008 |
| EP | 1840523 B1 | 3/2011 |
| EP | 1986170 B1 | 4/2011 |
| GB | 2329970 B | 11/2001 |
| GB | 2 366 157 A | 2/2002 |
| GB | 2366157 B | 2/2003 |
| WO | 2007002753 A2 | 1/2007 |
| WO | 2007081929 A2 | 7/2007 |

OTHER PUBLICATIONS

Barnett, Jim, et al. "State Chart XML (SCXML): State machine notation for control abstraction." W3C working draft (2007).*
Kreutel, Jörn. "SciML: Model-based Design of Voice User Interfaces.", Procedings of the 8th SIGdial Workshop on Discourse and Dialogue, pp. 235-238, Sep. 2007.*
Kölzer, Anke. "Diamod: a tool for modeling dialogue applications." Proceedings of the COLING-2000 Workshop on Using Toolsets and Architectures to Build NLP Systems. Association for Computational Linguistics, 2000.*
A. Kölzer, "Universal Dialogue Specification for Conversational Systems." In Workshop on Knowledge and Reasoning in Practical Dialogue Systems. 1999.*
Fleischmann, Thomas. "Model based HMI specification in an automotive context." Human Interface and the Management of Information. Methods, Techniques and Tools in Information Design. Springer Berlin Heidelberg, 2007. 31-39.*
Desmet, Brecht, et al. "Context-oriented domain analysis." Modeling and Using Context. Springer Berlin Heidelberg, 2007. 178-191.*
Schaefer, Robbie, Steffen Bleul, and Wolfgang Mueller. "Dialog modeling for multiple devices and multiple interaction modalities." Task Models and Diagrams for Users Interface Design. Springer Berlin Heidelberg, 2007. 39-53.*
Goronzy, S., R. Holve, and R. Kompe. "The role of Speech Recognition in Multimodal HMIs for Automotive Applications." Advanced Microsystems for Automotive Applications 2005. Springer Berlin Heidelberg, 2005. 335-349.*
Ball, Thomas, et al. "Sisl: Several interfaces, single logic." International Journal of Speech Technology 3.2 (2000): 93-108.*
Sathish, Sailesh, and Cristiano di Flora. "Supporting smart space infrastructures: a dynamic context-model composition framework." Proceedings of the 3rd international conference on Mobile multimedia communications. ICST (Institute for Computer Sciences, Social-Informatics and Telecommunications Engineering), 2007.*
Flores, Andres, et al. "Towards context-aware testing for semantic interoperability on PvC environments." Systems, Man and Cybernetics, 2004 IEEE International Conference on. vol. 2. IEEE, 2004.*
Muller-Glaser, K. D., et al. "Heterogeneous modeling for automotive electronic control units using a case-tool integration platform." Computer Aided Control Systems Design, 2004 IEEE International Symposium on. IEEE, 2004.*
Wilcock, Graham. "SCXML and voice interfaces." 3rd Baltic Conference on Human Language Technologies, Kaunas, Lithuania. Citeseer. 2007.*
International Search Report for PCT Application No. PCT/CA2006/000946, Nov. 8, 2006.
European Search Report for EP Application No. 06752782.0, Mar. 1, 2010.
International Search Report for PCT Application No. PCT/CA2009/000370, Jul. 6, 2009.

* cited by examiner

MULTI-PARTICIPANT, MIXED-INITIATIVE VOICE INTERACTION SYSTEM

This application claims priority to U.S. Provisional Application Ser. No. 61/039,248, filed Mar. 25, 2008.

BACKGROUND OF THE INVENTION

This invention relates to a multi-participant, mixed-initiative voice interaction system. Existing interactive voice response (IVR) systems are designed to carry out appropriate actions in response to spoken or audible information. Examples of these systems include voice-driven phone directory services, and automated customer support systems. The interaction is driven by time and the human participant.

A single-participant voice-interaction system is effective for information retrieval activities, but not always the best choice for scenarios in which events are generated from sources or participants other than the individual providing speech input. Modeling multi-participant systems is important to clearly define and describe system behavior. Traditional IVR systems can be modeled effectively using call tree structures, with decision points based on human spoken commands. Unfortunately, using the same call-tree modeling process for multi-participant voice interaction systems results in overly complex decision points and redundancies.

Further, in some IVR systems, voice instructions from the system are cumbersome and inefficient. For example, external, variable delays often exist when retrieving information. Examples of these delays include accessing variable-length message content from a mobile device, or accessing information across a non-deterministic (wireless) network. Providing any human participants with verbal status information is important, but not always necessary. For example, the spoken "please wait" message sometimes takes longer to read out loud than the time typically required to retrieve the desired information. This is inefficient and makes the interface less pleasant for the user.

SUMMARY OF THE INVENTION

A voice interaction system including one or more independent, concurrent state charts, which are used to model the behavior of each of a plurality of participants. The model simplifies the notation and provide a clear description of the interactions between multiple participants. These state charts capture the flow of voice prompts, the impact of externally initiated events and voice commands, and capture the progress of audio through each prompt. This system enables a method to prioritize conflicting and concurrent events leveraging historical patterns and the progress of in-progress prompts.

In accordance with another independent feature of the present invention, a slight delay is observed prior to the presentation of some audio prompts. This gives the system time to determine whether another, higher-priority prompt should be presented instead. Additionally, during the delay, the system may also determine that the audio prompt need not be presented at all.

In accordance with another independent feature of the present invention, the system provides voice-guided installation and setup instructions, such as for pairing with mobile devices or headsets. This approach leverages context-relevant spoken prompts to guide an individual through the installation process. For example, the Bluetooth pairing process between the control unit and mobile device is assisted with spoken prompts to guide the user through entry of a passkey, setup of their mobile devices, and to provide verbose diagnostic information to help resolve pairing issues.

DETAILED DESCRIPTION OF THE PREFERRED EMBODIMENT

Figure 1:
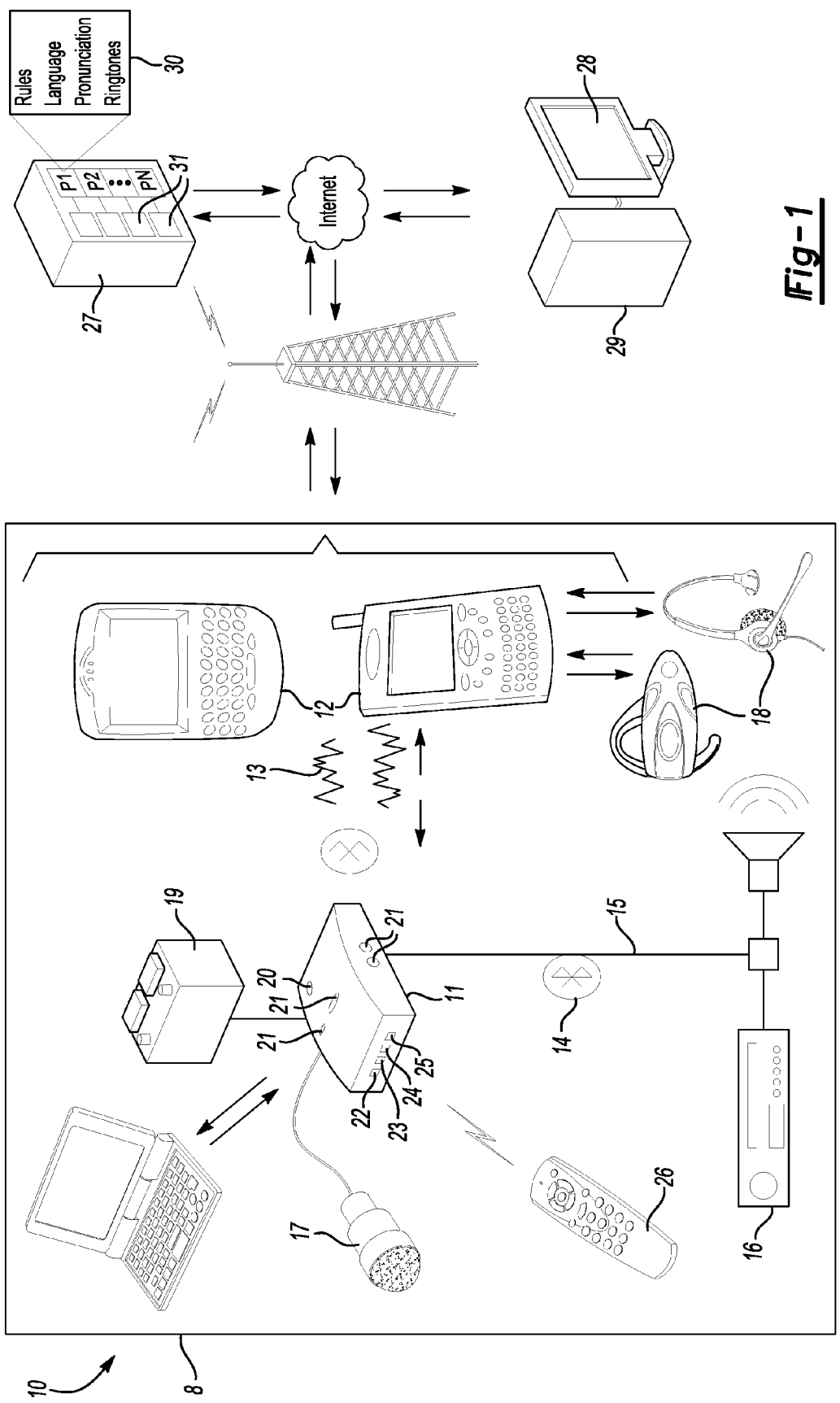
FIG. 1 schematically illustrates a communication system according to one embodiment of the present invention.

A communication system 10 is shown in FIG. 1 as implemented in a vehicle 8. The system 10 includes a device control unit 11 which is preferably mounted in a discreet location within the vehicle 8, such as under the dashboard, in the glove compartment, etc. The control unit 11 supports wireless communication via Bluetooth (IEEE 802.15.1) or any other wireless standard to communicate wirelessly with a cell phone, PDA, or other mobile device 12. All data 13 is encrypted prior to transmission. The audio output of the control unit 11 is transmitted either wirelessly 14 or through a direct, wired connection 15 to the vehicle's car stereo 16. The audio input for the control unit 11 is obtained either through a directly connected microphone 17, through an existing vehicle hands-free system, or wirelessly though a headset 18 connected to the mobile device 12.

The control unit 11 connects to the vehicle's battery 19 for power. An AC adapter is available for use at home or in the office. For portable use in other vehicles, an optional "Y" or pass-through cable is available to plug into a cigarette lighter accessory socket for power.

The control unit 11 contains a recessed button 20 which enables the driver to do the following: register new or replacement remotes; pair the device with a new mobile device 12; and clear all preferences and reset the device to its factory default settings. The control unit 11 also has a set of four status lights 21 which display the following information: power and system health, vehicle connection status and activity, mobile device connection status and activity, and information access and general status.

In one example, the control unit 11 and the mobile device 12 recognize when the user, and the user's associated mobile device 12, are near to, or have entered the vehicle. This may be accomplished, for example, by Bluetooth pairing of the device and the vehicle, or similar wireless communication initiation protocols. Within this range, the handheld device 12 changes from its normal, self-contained operating mode, to an immersive communication mode, where it is operated through the control unit 11. As will be described in more detail below, among other things, this mode enables the user to hear their emails played through the vehicle's sound system 16, or, alternatively, and if so equipped, played through the sound system of the mobile device 12, e.g., headphones 18. Microphones 17 in the vehicle 8 or on the mobile device 12 detect user-generated voice commands. Thus, the user is not required to change modes on the mobile device 12; instead, the control unit 11 and associated mobile device 12, recognize that the user is proximate the vehicle 8 and adjust the mode accordingly.

In addition to adjusting the mode based on vehicle proximity, the system 10 may adjust between a public and a private mode. For instance, as explained above, the system's immersive communication mode ordinarily occurs when the user is proximate the vehicle 8. The immersive communication mode may have a public setting and a private setting. The public setting plays the emails over headphones 18 associated with the mobile device 12. Such a setting prevents a user from disturbing other occupants of the vehicle 8. The private setting plays the emails over the vehicle sound system 16, and is ordinarily used when the user is the only occupant in the vehicle 8.

Of course, such system settings may be adjusted by the user and their particular preferences in their user profile. For example, the user may prefer to switch to the immersive communication mode when the mobile device 12 and user are within a certain distance from the vehicle 8, whereas another user may switch modes only when the mobile device 12 and user have entered the vehicle 8. Further, the user may want to operate the control unit 11 and associated device 12 in a public mode, even if other occupants are in the vehicle 8.

Similarly, the system 10 recognizes when the user leaves the vehicle 8 and the mobile device 12 reverts to a self-contained (normal) mode. The mobile device 12 may also record the vehicle's location when the user leaves the vehicle 8 (based upon GPS or other information). Accordingly, the user can recall the vehicle position at a later time, either on the device or elsewhere on the system, which may aid the user in locating the vehicle 8.

The device has multiple USB ports 22. There are standard USB ports which serve the following functions: to enable the driver to store preferences, settings, and off-line memos and transcriptions on a standard USB flash drive; to permit future expansion, upgrades, and add-on features; and to connect an Ethernet dongle for high-speed internet access. In addition, the control unit 11 has a dual-purpose USB 2.0 port which in addition to the features mentioned above, provides USB 2.0 "on-the-go" functionality by directly connecting to the USB port of a notebook computer with a standard cable (i.e. just like connecting a portable camera or GPS unit directly to a computer).

Other ports on the control unit 11 include an ⅛" audio jack 23 to connect to a car stereo without Bluetooth support, a ⅛" microphone jack 24 to support external high-quality microphones for hands-free calling, and a ⅛" stereo headset jack 25 for use away from the vehicle or in a vehicle without Bluetooth support.

The system 10 also includes an optional remote control 26 to interact with the control unit 11. The remote control contains lithium batteries, similar to that of a remote keyless entry remote for a common vehicle.

In order to provide security and privacy, the device uses both authentication and encryption. Voice-based biometrics may also be used to further enhance security.

The driver stores his or her settings for the device in their settings profile 30. This profile 30 may be stored in a database on an Internet server 27. The control unit 11 utilizes the internet access provided by the driver's mobile device 12 to download the driver's profile 30 via the Internet. The control unit 11 also uses the pairing information from the mobile device 12 to retrieve the correct profile 30 from the server 27. If the profile 30 has already been downloaded to the control unit 11, the control unit 11 may just check for changes and updates on the server 27. Each profile 30 on the server 27 contains a set of rules that the control unit 11 uses to make decisions on content delivery to the driver. The driver can access and modify their profile 30 on the Internet server 27 through either the Internet using a web-based interface 28, or through a simple interface directly accessible from the associated mobile device 12. Alternatively, the profile 30 is always stored and modified on the control unit 11 only and can be accessed via the mobile device 12 and/or via a USB connection to a laptop or desktop computer.

Figure 2:
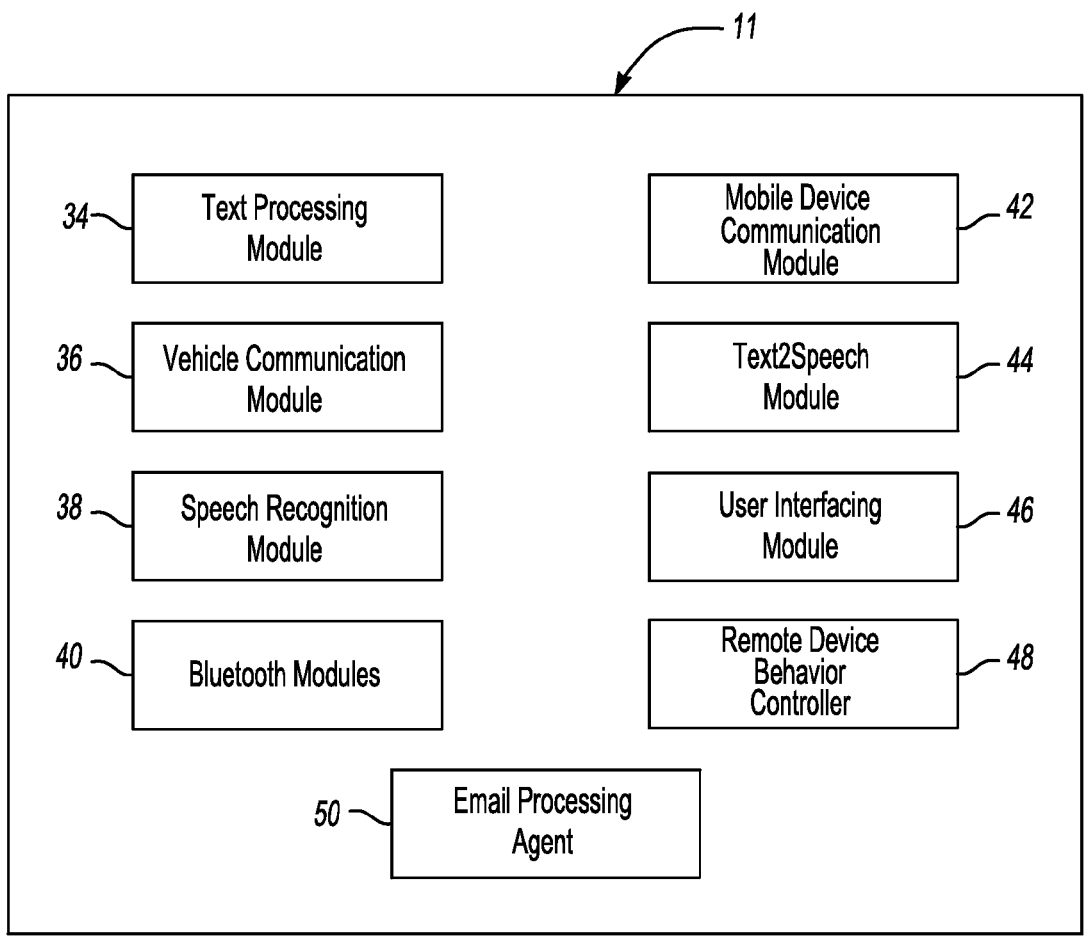
FIG. 2 illustrates some of the components of the control unit of the communication system of FIG. 1.

As shown in FIG. 2, the control unit 11 includes a text processing module 34, a vehicle communication module 36, a speech recognition module 38, Bluetooth (or other wireless communication) modules 40, a mobile device communication module 42, a text-to-speech module 44, a user interface module 46, and a remote device behavior controller 48. The control unit 11 has an email processing agent 50 that processes email messages and determines the identity of the sender, whether the message has an attachment, and if so what type of attachment, and then extracts the body-text of the message. The control unit 11 also determines if a message is a reminder, news, or just a regular email message. The control unit 11 uses a data mining algorithm to determine if any parts of the email should be excluded (e.g. a lengthy signature).

Hands-Free Email

One feature of the system is hands-free email. Using the text-to-speech module 44, the control unit 11 can read email to the driver. When new email arrives, the control unit 11 uses the profile 30 to guide an intelligent filtering and prioritization system which enables the driver to do the following: ensure that emails are filtered and read in order of priority, limit the frequency of new email interruptions, send automatic replies without driver intervention, and forward certain emails to a third-party without interruption. In addition, prior to being read out loud, the control unit 11 processes emails to optimize clarity. Part of that process involves detecting acronyms, symbols, and other more complex structures and ensuring that they can be easily understood when read. The control unit 11 provides intelligent email summarization in order to reduce the time required to hear the important content of email when read out loud.

The driver can interact with the control unit 11 using voice commands, including "go back" and "go forward," to which the control unit 11 responds by going back to the previous phrase or sentence or the next phrase or sentence in the email respectively. In addition, speaking "go back, go back" would back up two phrases or sentences.

Additional hands-free email features include a time-saving filtering system which allows the driver to hear only the most important content or meaning of an email. Another email-related feature is the ability to download custom email parsers to add a new dimension to audible email, and to parse informal email styles (i.e. 18r, ttyl).

The hands-free email functionality includes content-rich notification. When providing notification of a new email, the control unit 11 provides a quick summary about the incoming email, enabling the driver to prioritize which messages are more important. Examples include "You have mail from Sally" (similar to a caller-ID for email), or "You have an important meeting request from Cathy." The control unit 11 looks up the known contact names based upon the sender's email address in the user's address book on the mobile device 12. The control unit 11 uses known contact names to identify the parties of an email instead of just reading the cryptic email addresses out loud.

In addition to reading email, the control unit 11 also enables the driver to compose responses. The driver can send a reply using existing text or voice templates (i.e. "I'm in the car call me at 'number,'" or "I'm in the car, I will reply as soon as I can"). New emails can also be created and sent as a voice recording in the form of a .wav or .mp3 file. The driver is also provided the option of calling the sender of the email on the phone using existing contact information in the address book, or responding to meeting requests and calendar updates (i.e. Outlook). Emails can also be created as freeform text responses by dictating the contents of the email. The device then translates that into text form for email transmission. An intelligent assistant will be immediately available to suggest possible actions and to provide help as needed. Again all of these options are prompted by verbal inquires by the control unit 11 which can be selected by voice commands by the driver.

The control unit 11 supports multiple email accounts, and email can be composed from any existing account. Incoming email can also be intelligently handled and prioritized based upon account. Optional in-vehicle email addresses on a custom domain are available. Emails sent from this address would include a notification that the email was composed while in transit. When composing an email to an in-vehicle email address, the sender knows that the email will be read out loud in a vehicle. If the traditional email is "george@work.net," then the in-vehicle address may be "george@driving.net." Optional enhanced existing email addresses are also available on supported email systems. For example, if the traditional email is "george@work.com," an enhanced in-vehicle address of "george+driving@work.com" may be selected.

Enhanced Hands-Free Telephone Calls

Another feature of this invention is enhanced hands-free telephone calls. This includes transparent use of any existing hands-free system. All incoming telephone calls can use either the existing vehicle hands-free system or a user headset 18. If an expected important email arrives while the driver is on the phone, an "email-waiting" indicator (lights and/or subtle tones) will provide subtle notification without disrupting the conversation. A headset 18 can be activated at any time for privacy or to optimize clarity. The control unit 11 will seamlessly switch from the vehicle hands-free system to the private headset 18 for privacy.

The control unit 11 also features enhanced caller-ID. The device announces incoming calls by reading the caller name or number out loud (e.g. "This is a call from John Doe, do you want to answer it?"). This eliminates the need to look away from the road to find out who is calling. Vehicle-aware screening can also automatically forward specific calls to voicemail or to another number when driving, again based upon the driver's profile. Normal forwarding rules will resume when leaving the vehicle.

The control unit 11 also provides voice activated answering and calling. When the control unit 11 announces a telephone call, the driver can accept the call using a voice command. The driver can use voice commands associated with either contacts in an address book or with spoken phone numbers to place outgoing telephone calls (i.e. "Call Krista").

Unified Information Management

Another feature of the present invention is that it provides unified information management. The control unit 11 provides a consistent interface for seamless access to incoming and outgoing telephone calls, email, and other sources of information. The existing hands-free interface automatically switches between telephone calls, reading email, and providing important notifications. When entering the vehicle, the control unit 11 automatically provides an enhanced voice-based interface, and when leaving the vehicle, the mobile device 12 automatically resumes normal operation. Email reading can also be paused to accept an incoming phone call, and can be resumed when the call is complete.

In addition, the driver can communicate with any contact through email, a phone call, or an SMS text message simply by speaking. The control unit 11 provides enhanced information for incoming telephone calls. The name and number, if available, are read out loud to ensure that the driver knows the caller without looking away from the road. A nickname, or other information located in an address book, may also be used for notification.

The driver can also reply to an email with a phone call. While reading an email, the driver can contact the sender by placing a telephone call with address book information. When a phone call is made, but the line is busy or no voicemail exists, the user is given the option of sending an email to the same contact instead. This eliminates the need to wait and try calling the person again.

Within their profile 30, the driver can prioritize between email and phone calls, so that an important email will not be interrupted by a less important phone call. In addition, custom mp3 (or other format) ring tones can be associated with both incoming emails and telephone calls. Ring tones can be customized by email from certain contacts, phone calls from certain contacts, or email about certain subjects. Custom "call waiting" audible indicators can be used when an important email arrives while on the phone, or when an important phone call arrives while reading or composing an email.

Enhanced Hands-Free Calendar

Another feature of the present invention is the enhanced hands-free calendar wherein the control unit 11 utilizes the calendar functionality of the user's mobile device 12. The control unit 11 reads the subject and time of calendar reminders out loud, and the driver can access additional calendar information with voice commands if desired. The driver can also perform in-transit schedule management by reviewing scheduled appointments (including date, time, subject, location and notes); accepting, declining, or forwarding meeting requests from supported systems (e.g. Outlook); scheduling meetings; and automatically annotating meetings with location information. The driver can also store location-based reminders, which will provide reminders the next time the vehicle is present in a specified geographical area, and automatically receive information associated with nearby landmarks. In addition, the driver could plan and resolve meeting issues by communicating directly with other participants' location-aware devices.

Do Not Disturb

Another feature of the present invention is the "do not disturb" functionality. When passengers are present in the vehicle, the control unit 11 can be temporarily silenced. Even when silent, the control unit 11 will continue to intelligently handle incoming email, email forwarding, providing automatic email replies, and processing email as desired. A mute feature is also available.

Integrated Voice Memo Pad

Another feature of the present invention is the integrated voice memo pad, which enables the driver to record thoughts and important ideas while driving so they will not be forgotten while parking or searching for a memo pad or device. Memos can be transferred via email to the driver's inbox, or to any of the driver's contacts. Memos can also be wirelessly transferred to a computer desktop via the Bluetooth interface as the user arrives in the office, or transferred to a removable USB flash memory drive. Memos can also be annotated automatically using advanced context information including location, weather, and trip information. For example, "this memo was recorded at night in a traffic jam on the highway, halfway between the office and the manufacturing facility." Such augmented information can provide valuable cues when reviewing memos.

Access to Diverse Information

Another feature of the example embodiment of the present invention is the ability to access to diverse information. Information is available in audible form (text-to-speech) from a wide range of sources. First, the control unit 11 provides access to personal connectivity and time management information. This includes email (new and previously read), incoming caller name and number, SMS messages, MMS messages, telephone call logs, address book, calendar and schedule, and instant messages.

Second, the control unit 11 provides multi-format support. This includes email attachments that can be read out loud, including plain text, audio attachments (i.e. .wav, .mp3), HTML (i.e. encoded emails and web sites), plain text portions of Word and PowerPoint files, Adobe Portable Document format (PDF), OpenDocument formats, and compressed and/or encoded attachments of the above formats (i.e. .zip).

Third, the device provides environment and location awareness. This includes current location and navigation information, local weather conditions, vehicle status, and relevant location-specific information (i.e. where is "work", where is "home?").

Fourth, the control unit 11 provides remote access to information. This includes existing news sources (i.e. existing RSS feeds) and supported websites. This also includes subscription to value-added services including: weather, custom alerts (i.e. stock price triggers), traffic conditions, personalized news, e-books (not limited to audio books, but any e-book), personalized audio feeds, and personalized image or video feeds for passengers. The system obtains, translates, and provides personalized news content in audible form within a vehicle without explicit user requests. An individual may set their preferences by selecting from a set of common sources of information, or by specifying custom search criteria. When new information is available and relevant to the individual's preferences, it is read out loud to the individual when appropriate. Appropriate instances can be specified by the individual using a combination of in-vehicle presence detection, time-of-day, and importance of the information relative to other personal events including email, phone calls, meetings and text messages.

Individual preferences are fine tuned using negative feedback as specific stories and events are read out loud to the individual. This negative feedback is used in combination with the individual's personal search criteria to refine the relevance of future personalized content. In addition to online news content, the individual may also select other available online content, including stock market events and general web search terms. Some examples of personalized content include:

Weather
Custom alerts (i.e. stock price triggers)
Traffic conditions
Personalized news
e-books (Not limited to audio-books, but any e-book)
Personalized audio feeds
Personalized image or video feeds for passengers All text information is parsed and translated to optimize intelligibility before being read out loud to the individual.

Notification rules can be set by the individual using any combination of time interval, in-vehicle presence, and importance of the news event With appropriate location aware hardware support, notification rules can also include location based constraints. Desired news content can be selected using predefined templates or custom search terms.

User feedback is incorporated to maintain historical information about the news events to which the individual listens, news events that are interrupted, and news events to which the individual provides explicit feedback. This information is used to help filter subsequent news information and provide the user with more relevant news information the longer they use the service.

To minimize the volume of wireless data transfer, all searching and selection of relevant content is performed using a server with a wired data connection. Appropriate instances to present new information are detected locally (within the vehicle). When an appropriate instance occurs, a short request is sent to trigger the transmission of the most recent personalized news information from the search server.

Personalization

Another feature in the example system 10 is extensive personalization and customization for email handling, email notification, time-sensitive rules, vehicle-aware actions, text-to-speech preferences, and multiple user support.

The email handling settings in the user's profile 30 allow the driver to use the control unit's 11 built-in intelligent email parsing and processing. This enables the driver to avoid receiving notification for every trivial incoming email. Some of the intelligent parsing features include automatic replies, forwarding and prioritization based on content and sender, and substitution of difficult phrases (i.e. email addresses and web site URLs) with simple names and words. The driver can also choose to hear only select information when a new email arrives (i.e. just the sender name, or the sender and subject, or a quick summary). Email "ring tones" are also available for incoming emails based on sender or specific keywords. Prepared text or voice replies can be used to send frequently used responses (i.e. "I'm in transit right now"). Some prepared quick-responses may be used to automatically forward an email to a pre-selected recipient such as an administrative assistant. The driver can also set up both email address configuration and multiple email address rules (i.e. use "me@work.com" when replying to emails sent to "me@work.com," but use "me@mobile.com" when composing new emails).

The driver can also customize notification. This includes prioritizing emails and phone calls based on caller or sender and subject (i.e. never read emails from Ben out loud, or if an email arrives from George, it should be read before others). The driver can also limit the amount of notifications received (i.e. set minimum time between notifications, or maximum number of emails read in a short period of time).

Time-sensitive rules in the profile 30 may include options such as "don't both me in the morning," or "only notify me about incoming email between these hours." The driver can also configure audible reminder types based on calendar and scheduling items from the mobile device. Vehicle-aware actions are configurable based on the presence of the user in the vehicle. These actions include the content of automatic replies and predefined destinations and rules to automatically forward specific emails to an administrative assistant or other individual. These also include actions to take when multiple Bluetooth enabled mobile devices are present (i.e. switch to silent "do not disturb" mode, or take no action).

The text-to-speech settings for the device are also configurable. This includes speech characteristics such as speed, voice, and volume. The voice may be set to male or female, and may be set to speak a number of languages, including but not limited to US English, UK English, French, Spanish, German, Italian, Dutch, and Portuguese. A base set of languages will be provided with the device, with alternate languages being available in the future. The driver can set personal preferences for pronunciation of specific words, such as difficult contact names, and specialized acronyms or symbols, such as "$H_2O$." By default, most acronyms are spelled out letter by letter (i.e. IMS, USB).

Information about specific words or phrases can be used to enhance both speech recognition performance and text-to-speech performance, and this includes context sensitive shortcuts. For example, nicknames should be expanded into an email address if the driver is dictating an email. In addition, email addresses should be expanded to a common name when found. The driver can also set custom voice prompts or greetings.

The device also features multiple user support, wherein multiple people can share the same device. The device automatically identifies each person by their mobile device 12, and maintains individual profiles 30 for each driver.

Connectivity

The connectivity functionality of the control unit 11 enables it to function as a hands-free audio system. It interacts with supported Bluetooth hands-free devices, including but not limited to Bluetooth enabled vehicles (HS, HFP, and A2DP), after-market hands-free vehicle products, and supported headsets to provide privacy. For vehicles not containing Bluetooth or other wireless support, the control unit 11 can connect directly to the vehicle's audio system 16 through a wired connection. Retrofit solutions will also be available for existing vehicles lacking wireless connectivity in the form of an optional after-market Bluetooth kit.

The system 10 may include a remote control 26 for accessing the control unit 11. Emergency response support is available for direct assistance in emergencies, providing GPS location information if available. The driver could also use the control unit 11 through an advanced wireless audio/visual system, including such features as streaming music and providing image content (i.e. PowerPoint, images attached in emails, slideshows). Integrated steering-wheel column buttons is also an available option.

The control unit 11 can also connect to a computer and external devices. This includes personal computers with Bluetooth to conveniently exchange information over a personal area network (PAN). This also includes GPS devices (with Bluetooth or other wireless or wired connectivity) for location awareness. This also includes storage devices (Bluetooth or other wireless or wired) for personal e-book libraries, or to manage offline content with the unified hands-free interface. An optional cable will be available for controlling an iPod or other music player with voice commands. Through the device's USB ports, the driver can expand the functionality of the device by attaching such items as a USB GPRS/EDGE/3G device for direct mobile access without a separate mobile device, or a USB WiFi for high-speed Internet access.

Upgradeability and Expansion

The driver may add future enhancements to the control unit 11 wirelessly using standard Bluetooth enabled devices. This includes support for wireless transfer with a desktop or notebook computer to transfer and synchronize information. Advanced Bluetooth profile support (i.e. A2DP) for stereo and high quality audio is also available.

As mentioned previously, the control unit 11 will contain two USB ports. The standard USB port or ports will provide convenient access to standard USB devices for storing preferences on a standard USB flash drive; storing and moving off-line memos and transcriptions recorded by the device; and future expansion, upgrades, and add-on features. The dual-purpose USB 2.0 "On-The-Go" port or ports will provide both the aforementioned features to access USB devices, and also direct connections to a computer with a standard cable (i.e. just like connecting a digital camera or GPS unit directly to a computer).

Navigation

Figure 3:
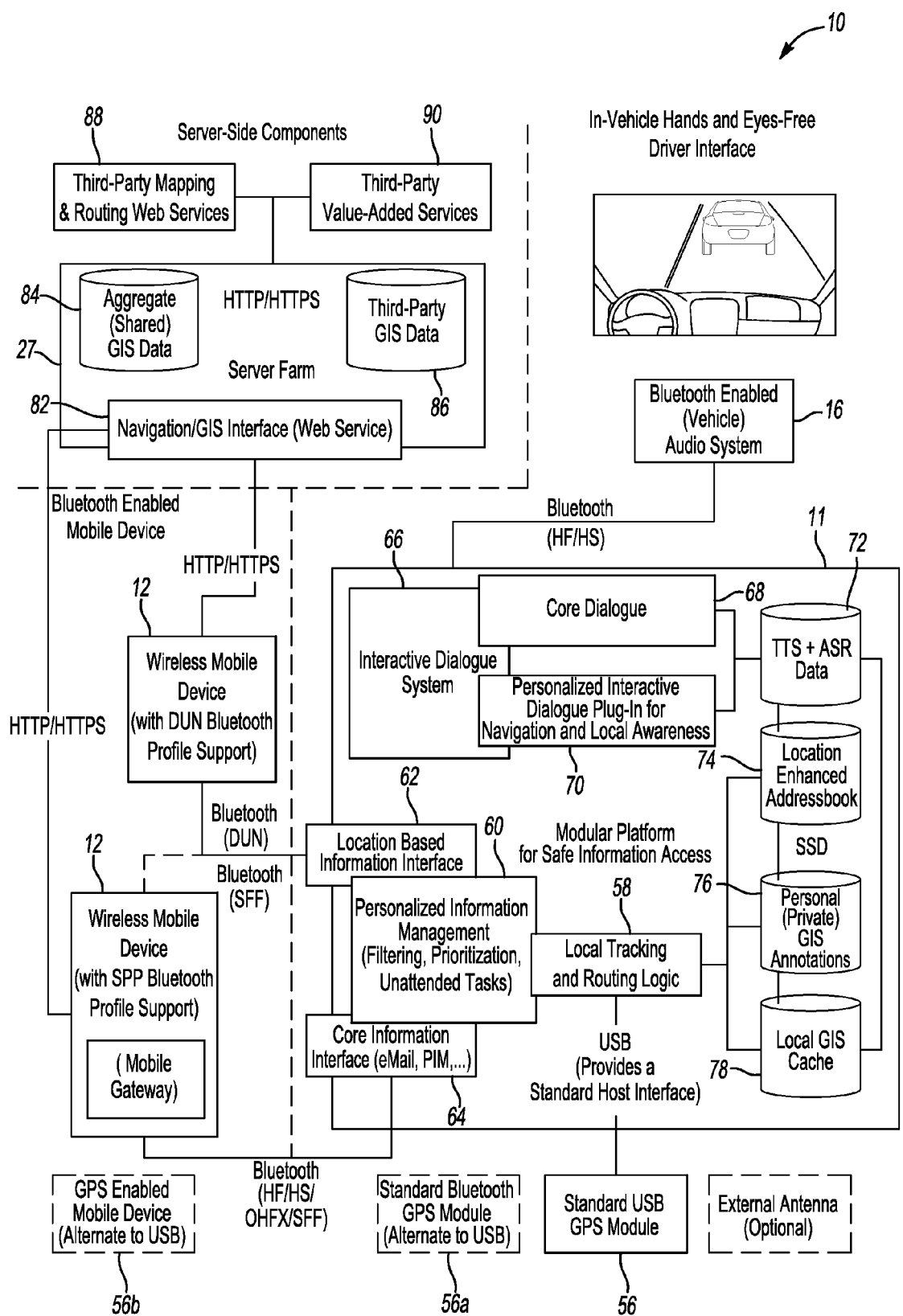
FIG. 3 is a schematic of the navigation functionality of the system of FIG. 1.

The navigation functionality of the system 10 is shown in FIG. 3. A GPS module 56 may be connected to the control unit 11 via USB. Alternatively, a Bluetooth GPS module 56a or a GPS module 56b integrated in the wireless mobile device 12 could be used to provide location, speed and heading information to the control unit 11.

The control unit 11 may include local tracking and routing logic 58 for determining the position of the control unit 11 relative to a digital map and for determining an optimal route to a desired destination.

The Personalized Information Management module 60 stores personalized settings, including rules regarding the content, timing, and verbosity of spoken directions. Prioritization allows spoken direction information to momentarily interrupt certain emails or phone calls if desired, or wait until other calls are complete. While driving, the current activity may be paused to quickly provide important spoken navigation directions. This integration is valuable to ensure an important turn is not missed because the driver was listening to the radio or incoming email. Prioritization is customizable to meet driver preferences, such as not interrupting important phone calls or emails, or interrupting only if a turn was missed. The Personalized Information Management module 60 prioritizes information from the location based information interface 62 and the core information interface 64 (e.g. email, PIM, and other features described previously). The location based information interface 62 communicates with the server 27 via the mobile device 12.

The driver can also store favorite destinations in the module 60 and retrieve them with a spoken request. An example of its use is to quickly find one's way home after getting lost, or to find the best route from an unfamiliar location to the next job site. A history of previous destinations and geographic areas is maintained to speed up future navigation requests.

The control unit 11 is capable of iterative discourse. For example, the control unit 11 converses with the driver to resolve ambiguous destinations, clarify unclear or noisy spoken commands, and request additional information when required.

The driver can find directions to new destinations by simply speaking the address. Location awareness, and use of personal preferences allows the control unit 11 to select the default local area such as town, city, province, state, or country so that the driver can simply ask for directions to an address without specifying the city when the driver is already in the area.

Directions are spoken to the driver using a natural-sounding voice. The current traveling speed, and local road network (# of lanes, posted speeds, travel restrictions, controlled intersections) is taken into account to provide unsolicited turn directions at the appropriate time in advance of the intersection. An example of these directions include, "turn left on Oak street, 3 blocks ahead", or "Turn right onto Water Street, just past the gas station".

The content and timing of spoken directions is customizable to satisfy driver preference. Some individuals may prefer to receive instructions long in advance, whereas others prefer to receive directions immediately before the next turn. This personalization feature includes options to provide all directions up front, adjust the advance notification of an upcoming turn (a function of vehicle speed and posted speed limits), to shorten or lengthen spoken directions if desired (verbose/terse).

Access to the address book in the mobile device 12 allows contacts to be referenced by name when requesting directions. This includes asking for directions to "Bob's office." Contacts without addresses, or with incomplete address information may be optionally completed using online sources when available (i.e. white pages, yellow pages, reverse phone number lookup).

Using the phone's address book together with its calendar/PIM, the control unit 11 will automatically plan driving routes to planned meetings, and provide custom responses to incoming email and phone calls. An example may include sending "I'm on my way, and plan to be there in about-_minutes," to emails from other individuals attending the same meeting. (Estimated time to arrival is determined by the routing logic).

While talking on the phone, or listening to an email, the driver can request the control unit 11 to plan a route to meet the contact in person. Again, the control unit 11 can access the address stored in the contacts list in the mobile device 12. Relevant emails, calendar entries, and SMS information can be quickly reviewed based on the driver's planned route. Relevant information is determined based on a sender or recipient of the email working or residing at or near the driver's destination.

Maps

Geographic information (e.g. digital maps, etc.) is dynamically downloaded and updated as needed from the navigation interface 82 on the server 27, accessed via a Bluetooth enabled mobile device 12. Basic data including nearby roads, addresses, and points of interest are accessed and cached locally in the control unit 11. This approach eliminates the need to plan ahead and manually install maps appropriate for the areas the driver plans to travel through. The automatic download process ensures maps and driving directions remain up to date at all times.

Alternatively, or additionally, detailed map data for selected areas can be provided to the control unit 11 using industry-standard USB storage (flash) or other portable, removable media. This allows map data to be downloaded using a PC onto a standard storage device, and plugged directly into the host USB port (or other communication interface) or using Bluetooth or other wireless communication from the PC. Using local map data stored on a USB device eliminates the need to use wireless bandwidth for routing, but requires advance planning to ensure the data on the USB device is up to date.

Alternatively, or additionally, online map data is, by default, cached to minimize wireless bandwidth for future routing requests. Map data can also be pre-loaded using a portable storage device, and automatically updated or augmented with additional online map information as needed. This provides the benefits of reducing wireless traffic, while ensuring map information remains up to date without explicitly downloading new maps from a PC.

Map updates are transferred to the control unit 11 in compressed form, containing only the information required for the current trip with enough information to handle re-routing after some missed turns without additional server updates.

Routing

Routing can be performed in three locations: by a third-party mapping and routing service 88, on the server 27, or locally in-vehicle by tracking and routing logic 58. The flexibility of the system 10 to support these different routing options allows the driver to select an appropriate balance between wireless bandwidth and local in-vehicle processing.

Performing routing on the server 27 allows aggregate driving information, and other dynamic sources of information to be incorporated in the routing process to make informed and helpful routing decisions. This includes automatically routing around temporary construction activities or accidents to avoid unnecessary delays. Performing routing on the server 27 minimizes the information required to be present in-vehicle, and keeps wireless traffic to a minimum.

Optionally, routing information can leverage existing heuristics and algorithms provided by third-party services 88 (i.e. Google maps, mapquest).

Optionally, the routing can be performed in-vehicle. With sufficient local map data (either previously cached, or provided with external storage), routing can be quickly performed in-vehicle. This approach minimizes latency when re-routing, and can eliminate the need to use wireless bandwidth.

Third-party map data 88 is supported from both remote online sources, and in local databases 86 (hosted on the server 27) to provide flexible future licensing arrangements. The Navigation Gateway 82 is a server-side platform that provides a consistent interface to access map data, regardless of its source. This interface is required to ensure that the control unit 11 can continue to reliably access up to date map information even after changes to third party services.

In addition to map data, third-party value-added services 90 can be provided through the Gateway 82 to further help the driver. These services may include location specific audio information such as advertisements, visitor information, "self"-guided interactive driving tours (tourism). Additional services can use this same interface to provide dynamic information that can help make more informed route planning decisions, including traffic congestion updates, and road work.

Aggregate information 84 from other travelers can be used to suggest alternate points of interest. "Other travelers visiting your current destination continued on to visit locations X, Y, and Z."

Third party value-added services 90 may also provide audio advertisements. The relevance of audio advertisements can be improved by targeting drivers traveling to specific destinations, or drivers that previously visited specific types of destinations.

Third party value-added services 90 may also provide tourism information. Rather than a general information FM broadcast found in some cities and tourism regions, audio information can be provided to a driver to describe their surroundings as they travel between points of interest.

To minimize wireless data traffic, location specific information is selected, parsed and compressed before transmission from the Navigation Gateway 82 to the control unit 11 via the Bluetooth enabled mobile device 12. In situations where significant map information already resides locally on the control unit 11, only incremental changes are compressed and sent out from the Navigation Gateway 82.

Current and past driving patterns can be optionally used to predict future travel and pre-cache relevant map information on the control unit.

Aggregate data 84 about direction requests and travel patterns from numerous sources can be used to both refine routing decisions, and to select helpful location specific information. This aggregate information can include web based routing queries if available, in addition to summarized GPS tracking system information and even feedback from other drivers using the system 10.

Figure 4:
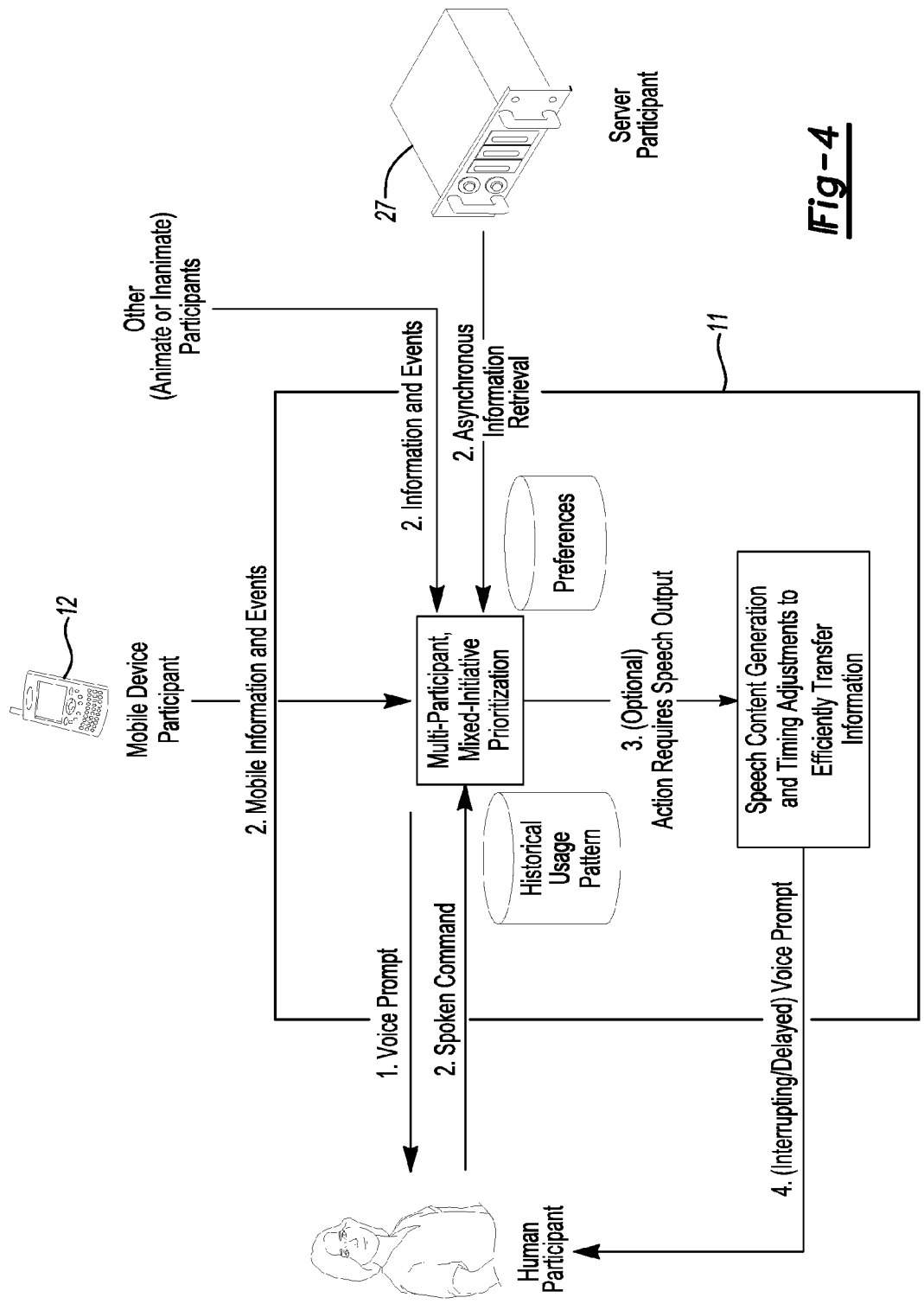
FIG. 4 is a schematic of the prioritization of the participants to the control unit of FIG. 1.

Referring to FIG. 4, the control unit 11 operates as a multi-participant, mixed-initiative voice-interaction system, which obtains events from all available sources (participants). Examples of these sources include: human sources (speech, tactile input, gestures), mobile device 12 sources (incoming message, reminder), server 27 sources (software updates, asynchronous query response), or local environmental sources (GPS signals, waypoint reminders, vehicle alert/warning signals). Any of these sources could generate an event to the control unit 11 at almost any time. The control unit 11 efficiently and quickly determines the priority of events.

The control unit's 11 response to events is determined using information about the current participants (i.e. which systems are connected or present?), the priority of events, and the current state of each participant. This process is important to ensure the most appropriate information is conveyed to any human participants if required, and to ensure the most appropriate action is carried out in a timely manner. For example, if an individual is interacting with the described system, and an important message arrives on a connected mobile device 12, the control unit 11 will use available information to decide when or if the human participant should be interrupted to convey the recently received information.

Information about current participants includes rules to help guide the prioritization process. These rules include both direct prioritization information such as "For human participant "B," an incoming phone call is of highest priority" in addition to indirect or historical usage pattern information such as "Human participant "B" ignored 95% of the previous interruptions about incoming messages when listening to navigation guidance." Other prioritization has been described above.

Efficient Transfer of Information using Speech

When conveying verbal information to a participant, it is logical to issue the first spoken prompt immediately, followed by subsequent prompts. Perhaps counter-intuitively, this approach is not always the most time-efficient or natural approach to convey verbal information in a natural manner within a multi-participant system. The control unit 11 leverages unique methods to reduce the total time required to convey important verbal information in a natural manner.

The control unit 11 introduces minor delays to selected output speech segments in an effort to minimize the total time required to communicate desired intent. Portions of this approach have similarities to Nagle's algorithm used to coalesce TCP/IP packets. This approach differs from Nagle's algorithm in its application to the human-computer interaction domain, its scheduling approach incorporating human patience, and its ability to eliminate or drop selected content to improve overall information transfer efficiency If new, higher priority information arrives before the slight delay elapses, the pending prompt or content segment may be omitted altogether and replaced with new content based on the new, higher priority information. If the delay did not exist, the initial prompt would need to be (unnaturally) interrupted to convey the new information, or additional time would be required to wait until the initial prompt completed before conveying the new information.

External, variable delays often exist when retrieving information. Examples of these delays include accessing variable-length message content from a mobile device 12, or accessing information across a non-deterministic (wireless) network. Providing any human participants with verbal status information is important, but not always necessary. For example, if the spoken "please wait" message takes longer to read out loud than the time typically required to retrieve the desired information, it is more time-efficient to omit the "please wait" message altogether. The delay duration for progress or status messages is selected to balance the patience of the human participant against statistics of expected arrival times for requested information.

Internal delays may also exist. The generation and transfer of information via speech is not instantaneous. Significant time is often required to read a sentence or phase aloud. Similarly, when messages are spoken aloud, they cannot always be instantaneously interrupted and still convey intelligible and natural spoken content. An example of this scenario is an incoming phone call. When an incoming call arrives, a system can decide to: a) Announce the fact that an incoming call exists, then follow up with more detailed information about the name or number, or b) Wait a small duration of time until more information is available to announce the name of the incoming caller. The small delay introduced in (b) can reduce the total time required between the arrival of the incoming phone call and the decision made by the user to answer or reject the call.

Voice-Guided System Installation

Installation and other interactive processes can be simplified by using spoken information generated by the control unit 11 being installed. This approach leverages context-relevant spoken prompts to guide an individual through the installation process. For example, the Bluetooth pairing process between the control unit 11 and mobile device 12 is assisted with spoken prompts to guide the user through entry of a passkey, setup of their mobile devices 12, and to provide verbose diagnostic information to help resolve pairing issues.

Spoken prompts are dynamically generated based on time, user input, and connection status. For example, on detection of an incoming mobile device 12 connection, the control unit 11 may prompt the user to enter a specific passkey. Alternately, instructions may be provided to describe how to use various buttons on the system to initiate the next steps in the installation process.

The verbosity of prompts may dynamically increase with the number of failed attempts, time elapsed, or combination of failed attempts in a short time interval.

Multi-Participant Modeling and Representation

In the control unit 11, one or more independent, concurrent state charts are used to model the behavior of each participant. This departure from a single (common) state machine or call tree typically used for IVR systems is valuable to simplify the notation and provide a clear description of the interaction model.

These state charts are important not only to capture the flow of voice prompts, but also to capture the progress of audio through each prompt. This information is important to describe the prioritization process in which the progress of an in-progress prompt can be leveraged.

Synchronization is explicitly enforced during prioritization of information and events.

Figure 5:
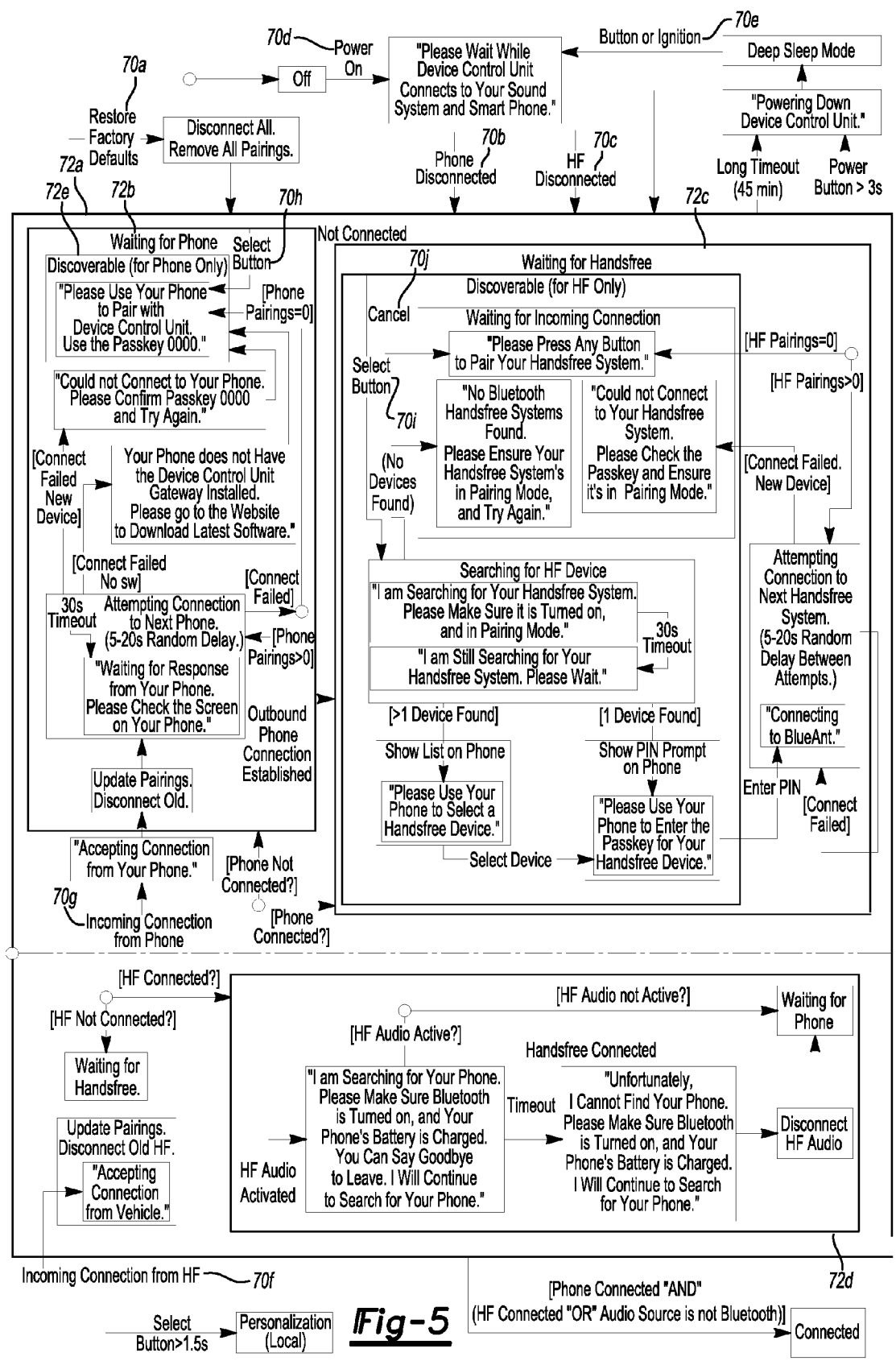
FIG. 5 is an example state chart for the control unit of FIG. 1.

FIG. 5 is an example state chart for use by the control unit 11 in operating the multi-participant, mixed-initiative system of FIG. 4 in powering up and pairing the control unit 11 with a mobile device 12 (FIG. 1) and headset 18 (FIG. 1). The control unit 11 executes software that implements the state chart of FIG. 5. The state chart includes a plurality of states, including states 72a-e, which are changed based upon events, including events 70a-j, from multiple sources (participants). For example, the state chart includes a "not connected" state 72a, a "waiting for phone (e.g. mobile device 12)" state 72b, "waiting for handsfree (e.g. headset 18)" state 72c, "handsfree connected" state 72d, "discoverable state" 72e, etc. The events include events from the multiple sources, including a command to restore factory defaults 70a (such as by holding down a recessed button), the mobile device 12 becoming disconnected 70b, the headset 18 becoming disconnected 70c, the power being switch on 70d, any button being pressed or vehicle ignition turned on 70e, an incoming connection from a headset 70f, or an incoming connection from a mobile device 70g.

FIG. 5 also demonstrates the voice-guided system installation and pairing process. As shown in FIG. 5, the control unit 11 ("iLane™") provides audible step-by-step instructions and feedback during the pairing process with the mobile device 12 and the headset 18.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method claim steps are for ease of reference in dependent claims and do not signify a required sequence unless otherwise specified in the claims.

What is claimed is:

1. A voice interaction system comprising:
   a processor programmed to initiate audible prompts, the processor receiving speech commands from a user, wherein the processor is programmed via a state chart model to receive events from a plurality of sources, prioritize the events and change states based upon the events, based upon the priority of the events and based upon the state chart model.

2. The voice interaction system of claim 1 further including:
   a speaker generating the audible prompts initiated by the processor; and
   a microphone receiving the speech command from the user.

3. The voice interaction system of claim 1 wherein the prioritization is based upon a stored set of user preferences.

4. The voice interaction system of claim 3 wherein the prioritization indicates priority of email messages.

5. The voice interaction system of claim 3 wherein the prioritization is based upon historical usage patterns of the user.

6. The voice interaction system of claim 1 wherein the processor introduces a delay prior to at least some of the audible prompts and wherein the processor determines whether a first audible prompt of the plurality of audible prompts should be generated during the delay.

7. The voice interaction system of claim 6 wherein the processor compares a priority of a first audible prompt during the delay to a priority of a second audible prompt to determine whether the first audible prompt or the second audible prompt should be generated.

8. The voice interaction system of claim 1 wherein the processor initiates a plurality of audible setup prompts to guide a user in setting up the system.

9. The voice interaction system of claim 8 wherein the plurality of setup prompts include prompts for assisting in pairing the system to a wireless device.

10. The voice interaction system of claim 1 wherein the state chart model is one of a plurality of independent state chart models, wherein the processor is programmed via the plurality of state chart models to receive events from the plurality of sources, prioritize the events and change states based upon the events, based upon the priority of the events and based upon the plurality of state chart models.

11. The voice interaction system of claim 1 where the state chart model includes a first state in which a first one of the plurality of sources is not connected to the processor.

12. The voice interaction system of claim 1 wherein the processor changes states in the state chart model based upon the events received from all of the plurality of sources.

13. A method of operating a voice interaction system including the steps of:
   a) receiving speech commands from a user at a processor;
   b) receiving a plurality of events from a plurality of sources at the processor, including the speech commands from the user;
   c) prioritizing the plurality of events from the plurality of sources with the processor;
   d) changing states in the processor based upon a state chart model, the received events and the priority of the events; and
   e) generating a plurality of audible prompts with the processor based upon said step d).

14. The method of claim 13 wherein the prioritization is based upon a stored set of user preferences.

15. The method of claim 13 further including the steps of introducing a delay prior to a first audible prompt of the plurality of audible prompts and during the delay determining whether the first audible prompt should be generated.

16. The method of claim 15 further including the step of during the delay comparing a priority of the first audible prompt to a priority of a second audible prompt to determine whether the first audible prompt or the second audible prompt should be presented.

17. The method of claim 16 further including the step of initiating a plurality of audible setup prompts to guide a user in pairing the system to a wireless device.

18. A method of operating a voice interaction system including the steps of:
   a) receiving speech commands from a user at a processor;
   b) receiving a plurality of events from a plurality of sources at the processor, including the speech commands from the user;
   c) prioritizing the plurality of events from the plurality of sources in the processor;
   d) generating a plurality of audible prompts with the processor based upon the received events and the priority of the events, including determining a first audible prompt to be presented;
   e) introducing a delay by the processor after said step d) and prior to presenting the first audible prompt; and
   f) during the delay, deciding in the processor whether to present the first audible prompt.

19. The method of claim 18 wherein said step f) further includes the step of, during the delay, deciding between presenting the first audible prompt or a second audible prompt based upon a prioritization of the first audible prompt and the second audible prompt.

20. The method of claim 18 wherein said step f) further includes the step of determining between whether to present the first audible prompt or whether to not present the first audible prompt.

21. The method of claim 18 wherein said step f) further includes the step of determining not to present the first audible prompt.

22. The method of claim 18 wherein said step e) further includes the step of introducing the delay by the processor after said step d) and prior to presenting any of the plurality of audible prompts.

23. The method of claim 21 wherein said step f) further includes the step of, during the delay, deciding between presenting the first audible prompt or a second audible prompt generated during the delay based upon a prioritization of the first audible prompt and the second audible prompt.

* * * * *